United States Patent [19]

Ishida et al.

[11] Patent Number: 5,587,735
[45] Date of Patent: *Dec. 24, 1996

[54] VIDEO TELEPHONE

[75] Inventors: Kiyoshi Ishida; Hiroshi Goto, both of Yokohama, Japan

[73] Assignee: Hitachi, Ltd., Tokyo, Japan

[ * ] Notice: The portion of the term of this patent subsequent to Mar. 21, 2012, has been disclaimed.

[21] Appl. No.: 361,957

[22] Filed: Dec. 22, 1994

Related U.S. Application Data

[63] Continuation of Ser. No. 918,054, Jul. 21, 1992, Pat. No. 5,400,068, and a continuation-in-part of Ser. No. 838,348, Feb. 20, 1992, Pat. No. 5,396,269.

[30] Foreign Application Priority Data

Jul. 24, 1991 [JP] Japan .................................... 3-184669

[51] Int. Cl.⁶ ............................ H04N 7/14; H04M 11/00
[52] U.S. Cl. ................................. 348/14; 348/17; 348/16; 379/93; 379/100
[58] Field of Search ................................ 379/93, 94, 100, 379/96; 348/13, 14, 15, 16, 17, 18, 19; H04N 7/14

[56] References Cited

U.S. PATENT DOCUMENTS

| | | | |
|---|---|---|---|
| 4,888,795 | 12/1989 | Ando et al. | 379/53 |
| 4,916,735 | 4/1990 | Iida et al. | 379/413 |
| 4,979,028 | 12/1990 | Minematsu et al. | 379/53 |
| 4,980,761 | 12/1990 | Natori | 358/85 |
| 5,003,532 | 3/1991 | Ashida et al. | 348/15 |
| 5,077,784 | 12/1991 | Fujita et al. | 379/53 |
| 5,392,284 | 2/1995 | Sugiyama | 379/96 |
| 5,396,269 | 3/1995 | Gotoh et al. | 348/14 |
| 5,400,068 | 3/1995 | Ishida et al. | 348/13 |

FOREIGN PATENT DOCUMENTS

| | | | |
|---|---|---|---|
| 355838 | 2/1990 | European Pat. Off. | H04N 7/14 |
| 0436345A2 | 7/1991 | European Pat. Off. . | |
| 1007881 | 4/1989 | Japan . | |
| 0149664 | 6/1989 | Japan | 379/53 |
| 4-265086 | 9/1992 | Japan | 379/53 |
| 4-265087 | 9/1992 | Japan | 379/53 |
| 2174518 | 11/1986 | United Kingdom | 379/420 |

OTHER PUBLICATIONS

*Review of the Electrical Communication Laboratories*, "Video Communication Terminals for Broadband Switching Network Service" T. Hisaki, et al., 1985, No. 4, Tokyo, Japan.

*Telematica*, "Endgerate Fur Die Bildkummunikation Im ISDN", W. Speltacker, Nov. 28, 1989.

The Collection of Lectures and papers (vol. 7) D–419, D–420, D–421, D–422, D–423 and D424 presented at the National Spring Meeting of the Japanese Electric Information Communication Society.

The Article "For Videophones, Light at the End of a Very Long Tunnel" by Data Communication, Dec. 1991, p. 116.

Primary Examiner—Jason Chan
Attorney, Agent, or Firm—Antonelli, Terry, Stout & Kraus

[57] ABSTRACT

A video telephone to be connected to the ISDN is a unitary structure comprising a communication controller for controlling communication of digital data, such as voice signal, image signal and facsimile/camera control signal, a dial or key panel unit, a telephone controller for controlling the functions of a handset and the key panel unit, a camera for inputting an image, a display for outputting an image, and image CODEC for coding an input image signal and decoding a received image signal. The camera is tiltable and detachable.

13 Claims, 9 Drawing Sheets

VIDEO TELEPHONE

This is a continuation of application Ser. No. 07/918,054, filed Jun. 21, 1992, U.S. Pat. No. 5,400,068, and is a Continuation-in-Part of application Ser. No. 07/838,348, filed Feb. 20, 1992, U.S. Pat. No. 5,396,269, the disclosure of which is incorporated herein by reference.

BACKGROUND OF THE INVENTION

1. Field of the Invention

This invention relates to a color motion-picture video telephone for communication of voice, image and other data in real time through a digital communication network.

2. Description of the Related Art

A color motion-picture video telephone is currently known which has a unitary structure composed of: a handset for communication of voice; a voice CODEC, a camera, a display and an image CODEC for communication of an image; and a communication controller for controlling such communications. In such a conventional television telephone, a single camera is tiltable between a normal horizontal position in which it can shoot the speaker in front of the telephone and a tilted position in which it can shoot a picture or a piece of writing placed on a desk or the like.

This prior art is exemplified by the collection of lectures and papers, (Volume 7) D-419, D-420, D-421, D-422, D-423 and D-424, presented at the National Spring Meeting of the Japanese Electric Information Communication Society.

Related Japanese applications by the present common assignee are, for example, Japanese Patent Application No. HEI 3-25987 for the structure of a video telephone and Japanese Patent Application No. HEI 3-25991 for the operation of a video telephone.

The conventional video telephone is disadvantageous in that the speaker must hold the handset in one hand for voice communication and that the camera has only a limited range of shooting. When shooting a picture or writing, the camera itself cuts off illumination of an interior lamp to throw a shadow over the picture or writing. Consequently there has been a requirement for a more convenient video telephone equipped with a wider variety of functions.

SUMMARY OF THE INVENTION

It is therefore an object of this invention to provide a video telephone with which a picture or writing can be illuminated without casting the speaker's there on shadow and which has a hands-free function enabling the speaker to do voice communication without actually holding a handset.

According to this invention, there is provided a video telephone for exchanging image data, voice data and user data through digital communication lines in real time, which is comprised (I) a mainframe-and-display unit including (a) a communication controller for controlling communication of the image data, the voice data and the user data, which are multiplexed, through the digital communication lines, (b) a multiplex separator for separating the multiplexed image data, the voice data and the user data which are to be transmitted and received by the communication controller, (c) an image CODEC for decoding the image data, which are separated by the multiplex separator, into an image signal and for encoding an input image signal into image data and transmitting the image data to the multiplex separator, (d) a voice communication controller for decoding the voice data, which are separated by the multiplex separator, into a voice signal and for encoding an input voice signal into voice data and transmitting the voice data to the multiplex separator, (e) a speaker for outputting speech according to the voice signal decoded by the voice communication controller, (f) a microphone for producing a voice signal from speech, and transmitting this signal to the voice communication controller as the voice signal to be encoded, (g) a power supply unit for receiving a supply of power from an external source and for distributing the power to various parts, (h) a key input unit having a plurality of keys, (i) a control unit for controlling, in response to a key input from the key input unit, operating of the video telephone, and (j) a display for displaying an image represented by the image signal which is decoded by the image CODEC; and (II) a camera unit including (k) a camera for producing an image signal, and outputting this signal to the image CODEC as the image signal to be encoded and (I) a lamp for illuminating a subject to be taken by the camera, the camera unit being angularly movably connected to the mainframe-and-display unit.

With this arrangement, since the camera angularly movably connected to the mainframe-and-display unit accommodates both a camera for outputting the image signal to the image CODEC as the image signal to be encoded and a lamp for illuminating a subject to be taken by the camera, it is possible to shoot a picture or a document using the camera as any potential shadow of the camera due to a lamp in the room is canceled by the built-in lamp.

DETAILED DESCRIPTION

Figure 1:
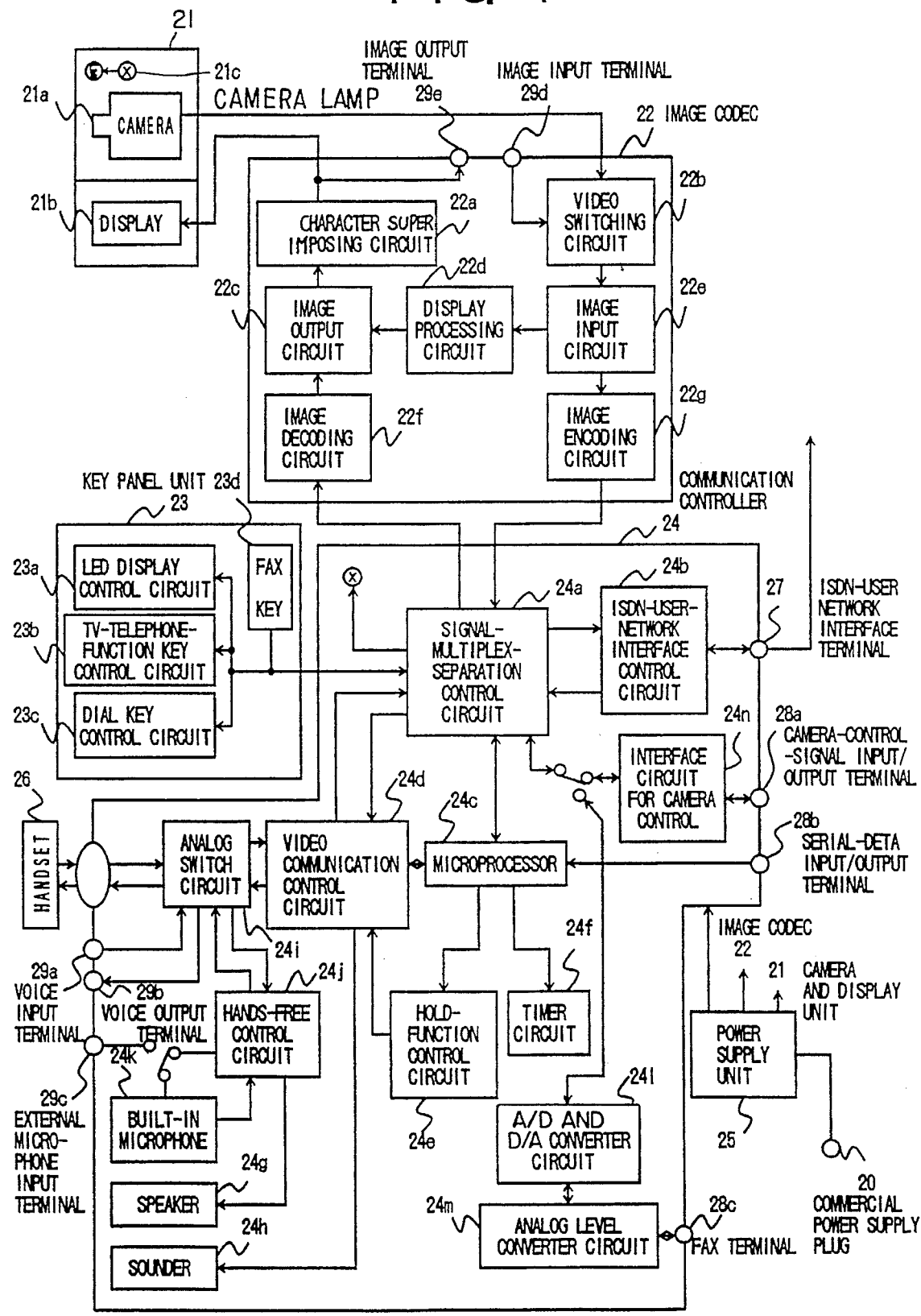
FIG. 1 is a block diagram of a video telephone according to one embodiment of this invention.

The principles of this invention are particularly useful when embodied in a video telephone such as shown in FIG. 1.

In FIG. 1, reference numeral 21a designates a camera; 21b, a display; 21c, a camera lamp; 21, a camera-and-display unit including the camera 21a, the display 21b and the lamp 21c; and 22, an image The image CODEC 22 includes a character superimposing circuit 22a, a video switching circuit 22b, an image output circuit 22c, a display processing circuit for controlling the display mode of the display screen, an image input circuit 22e, an image decoding circuit 22f for reproducing a picture signal from a received digital image signal, and an image encoding circuit 22g for converting a picture signal, which is outputted by the image input circuit 22e, into a digital signal for communication control described below.

Further, reference numeral 23 designates a key panel unit which includes an LED display control circuit 23a, a video-telephone-function key control circuit 23b, and a dial key control circuit 23c. Designated by 23d is a FAX key for controlling facsimile transmission.

Numeral 24 designates a communication controller which includes a signal-multiplex-separation control circuit 24a, an ISDN-user-network interface control circuit 24b, a microprocessor 24c for controlling various parts of the video telephone, a voice communication control circuit 24d, a hold-function control circuit 24e, a timer circuit 24f, a speaker 24g, a sounder 24h for generating a particular sound, and an analog switch circuit 24i. The communication controller 24 also includes a hands-free control circuit 24j, a built-in microphone 24k, an analog-to-digital converter circuit 24l for the facsimile interface, an analog level converter circuit 24m for the facsimile interface, and an interface circuit 24n for camera control.

Numeral 25 designates a power supply unit for inputting a commercial supply of power from an external source via a commercial power supply plug 20 to supply a constant voltage to the camera-and-display unit 21, the image CODEC 22 and the communication controller 24.

Numeral 26 designates a handset connected to a mainframe of the telephone by a cable.

Numeral 27 designates an ISDN-user-network interface terminal; 28a, a camera-control-signal input/output terminal; 28b, a serial-data input/output terminal; 28c, a facsimile terminal; 29a, a voice input terminal; 29b, a voice output terminal; 29c, an external microphone input terminal; 29b, an image input terminal; and 29e, an image output terminal. These terminals are input/output connectors provided on the rear surface of the mainframe of the telephone.

In the image CODEC 13, the image processing devices may be contained on a single sheet (e.g., A4 size) of image CODEC substrate by integrating each of the image encoding circuit 22g and the image decoding circuit 22f on a single very small semiconductor chip. In the communication controller 24, all parts except the speaker 24g and the microphone 24k may be contained on a single sheet (e.g., A4 size) of communication controller substrate by integrating the ISDN-user-network interface control circuit 24b and the voice communication control circuit 24d on a single very small semiconductor chip and also integrating the signal-multiplex-separation control circuit 24, etc. on a single very small semiconductor chip. The speaker 24g and the microphone 24k are directly attached to a mainframe 19 of the telephone. Thus the power supply unit, the two circuit substrates, the key panel unit 23 and the camera-and-display unit 21 as well as cables connecting these units are contained within the telephone, resulting in a unitary compact video telephone.

Figure 2:
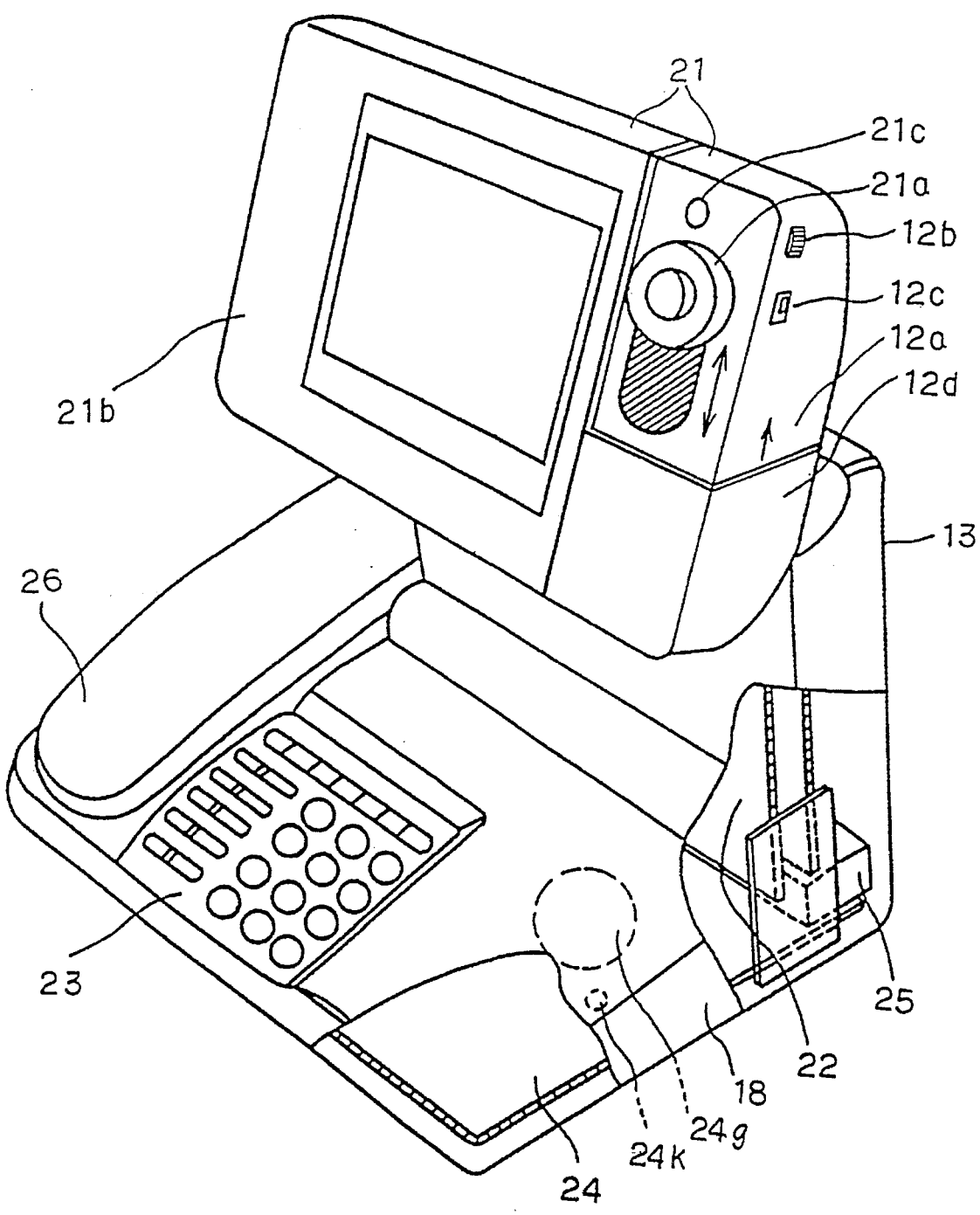
FIG. 2 is a perspective view of the video telephone of FIG. 1.

FIG. 2 shows the structure of the video telephone.

In FIG. 2, reference numerals 21b and 12a respectively designate the display and the camera, both at the head or top of an L-shaped body. 13 structure which includes the image CODEC 22 containing the image CODEC substrate, occupying the neck or vertical support portion of the L-shaped body. 18 designates a mainframe containing the communication controller 24, the key panel unit 23, the power supply unit 25, the built-in speaker 24g and the built-in microphone 24k, occupying the bottom or base portion of the L-shaped body. The key panel unit 23 is equipped with telephone-function keys, video telephone control keys and indicator lamps. 26 designates the handset. Also the mainframe 18 is equipped with external input/output terminals, as described below.

Systematically, the structure 13 is located between the camera 21a, the camera-and-display unit 21b and the communication control system, which includes the signal-multiplex-separation control circuit 24a, the ISDN-user-network interface control circuit 24b. Therefore it is possible to simplify the wiring between the substrates and hence to realize a compactly unitized video telephone. Further, since air flows from the lower side to the upper side of the vertical substrate, the structure 13 will have an increased heat radiation.

The camera 12a contains an auto-focusing compact color camera 21a and a lamp 21c, and is accommodated in a camera holder 12d angularly movably attached to the display 21b. The camera holder 12d is angularly movable between a normal horizontal position shown in FIG. 1, and a tilted position in which the camera 21a can shoot downwardly. Mounted on the camera holder 12d or the display 21b is a switch that will be turned on in response to the angular movement of the camera holder 12d over a predetermined angle with respect to the display 21b. While this switch is on, the microprocessor 24c controls the lamp 21c to be illuminated. The microprocessor 24c controls the lamp 21c to turn on/off according to a predetermined key input on the key panel unit 23.

At the joint of the camera holder 12d and the camera 12a, the camera holder 12d has a resilient mold complementary in shape to the joint end of the camera 12a so that the camera 12a can be attached to the camera holder 12d by being pressed into the camera holder 12d. Optionally the camera 12a may be removed from the camera holder 12d. For vertical fine adjustments, the camera 12a may be vertically slidable over a predetermined distance with respect to the camera holder 12d. Further the camera 21a may be slidable with respect to the camera 12a longitudinally along a shooting slot of the camera 12a. The camera 12a is connected to the mainframe 18 by a set cable of necessary signal lines and a power supply line. In FIG. 2, reference numeral 12c designates a switch for switching over between automatic iris and manual iris of the camera 21a, and 12b designates a fader type switch for illumination intensity adjustment.

Figure 3:
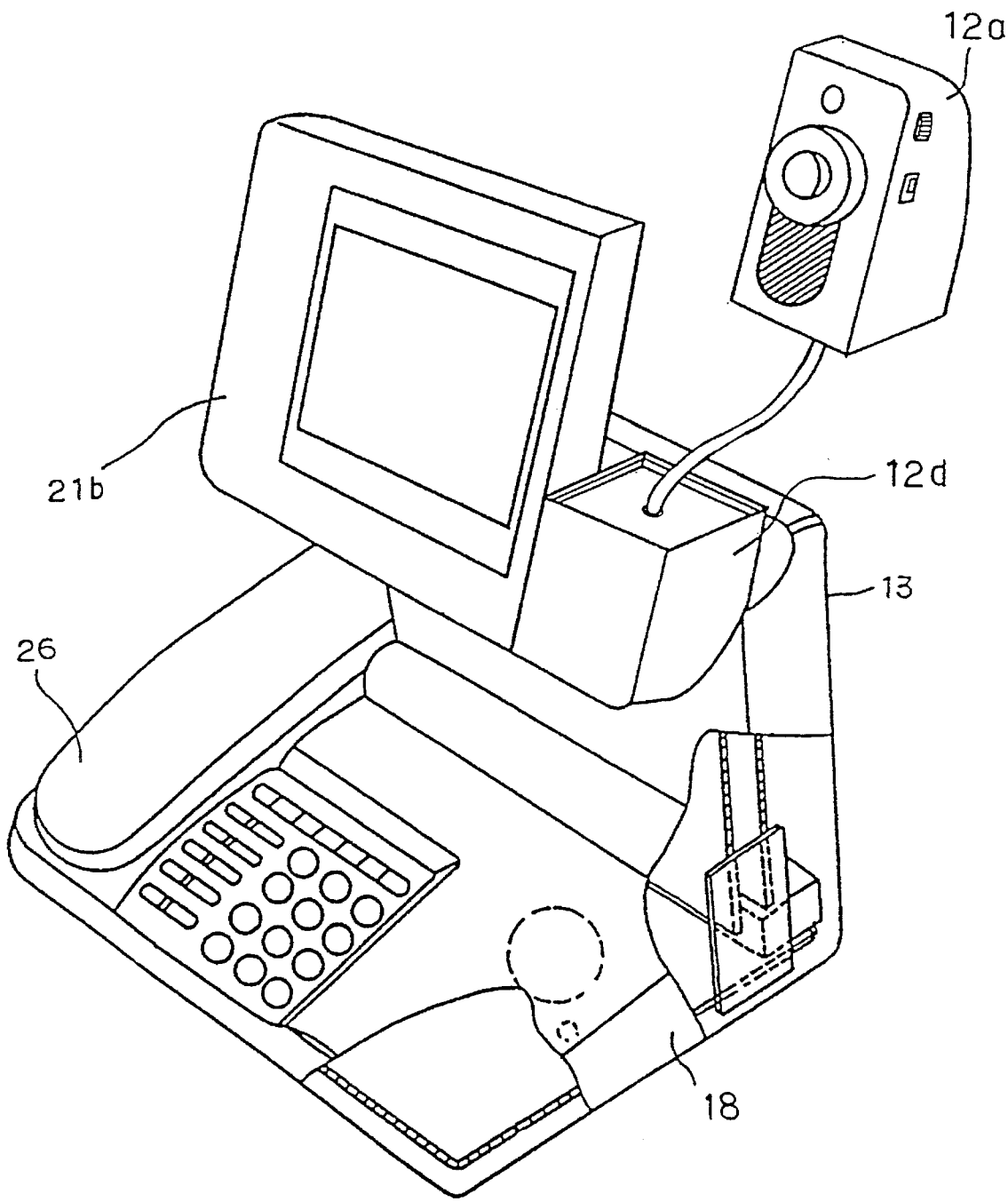
FIG. 3 shows the video telephone of FIG. 2 with a camera unit having been removed.

FIG. 3 shows the camera 12a having been removed from the camera holder 12d; in this position, the camera 21a can shoot in any desired direction.

Figure 4:
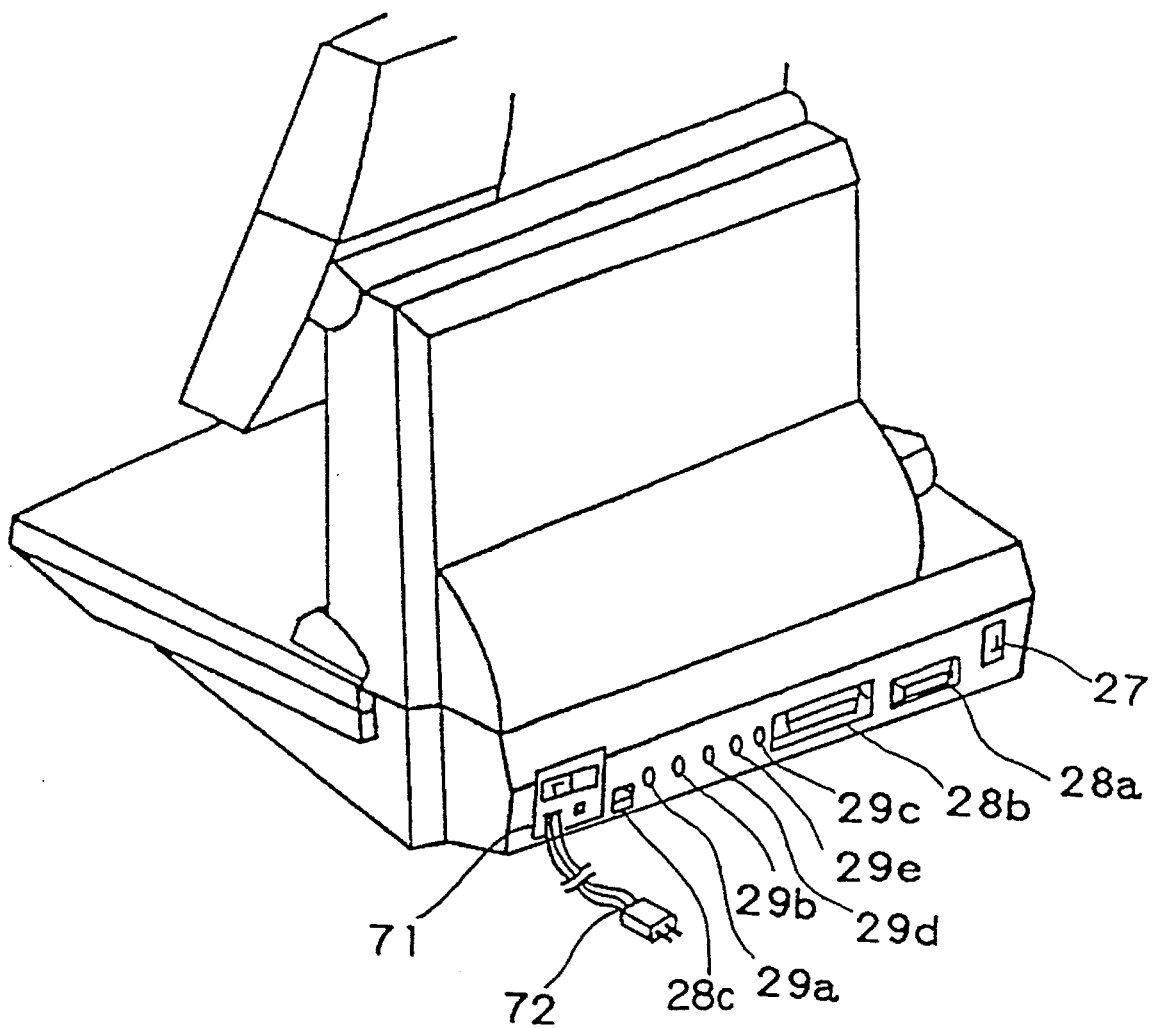
FIG. 4 is a perspective view showing how various connectors are arranged on the rear surface of the video telephone.

FIG. 4 shows various kinds of input/output terminals provided on the rear surface of the television telephone.

In FIG. 4, reference numeral 72 designates a commercial power supply cord for introducing an AC 100 V commercial power supply from an external source. The power supply is switched on and off by a power supply switch 71 28c is an interface for an external facsimile. The ISDN-user-network interface terminal 27 is a communication interface normally connected with a dedicated cord. To the voice input terminal 29a, a voice signal (such as of that from a tape recorder) may be inputted via a dedicated cord. To the voice output terminal 29b, an external speaker or the like is connected via a dedicated cord to-generate received speech. To the image input terminal 29d, an image signal (such as a television image signal or an external camera image signal) may be inputted via a dedicated cord. To the image output terminal 29e, a television receiver or the like may be connected via a dedicated cord to output a received image. To the serial-data input/output terminal 28b, a cable with an RS-232C interface connector may be connected to perform serial-digital-data transfer with, for example, a personal computer. To the camera-control-signal input/output terminal 28a, a cable with a dedicated digital interface connector may be connected to control and operate cooperatively with an external camera controller.

If an external microphone is connected to the external microphone input terminal 29c, it is automatically switched over from inputting a voice signal via the built-in microphone to inputting a voice signal via the external microphone. To the facsimile terminal 28c, an external facsimile may be connected.

With the video telephone according to this embodiment, since all of the external input/output interfaces are provided on the rear surface of the mainframe, various wiring cords connected with various external equipments can be grouped together to realize an expanded system with tidy wiring.

Figure 5:
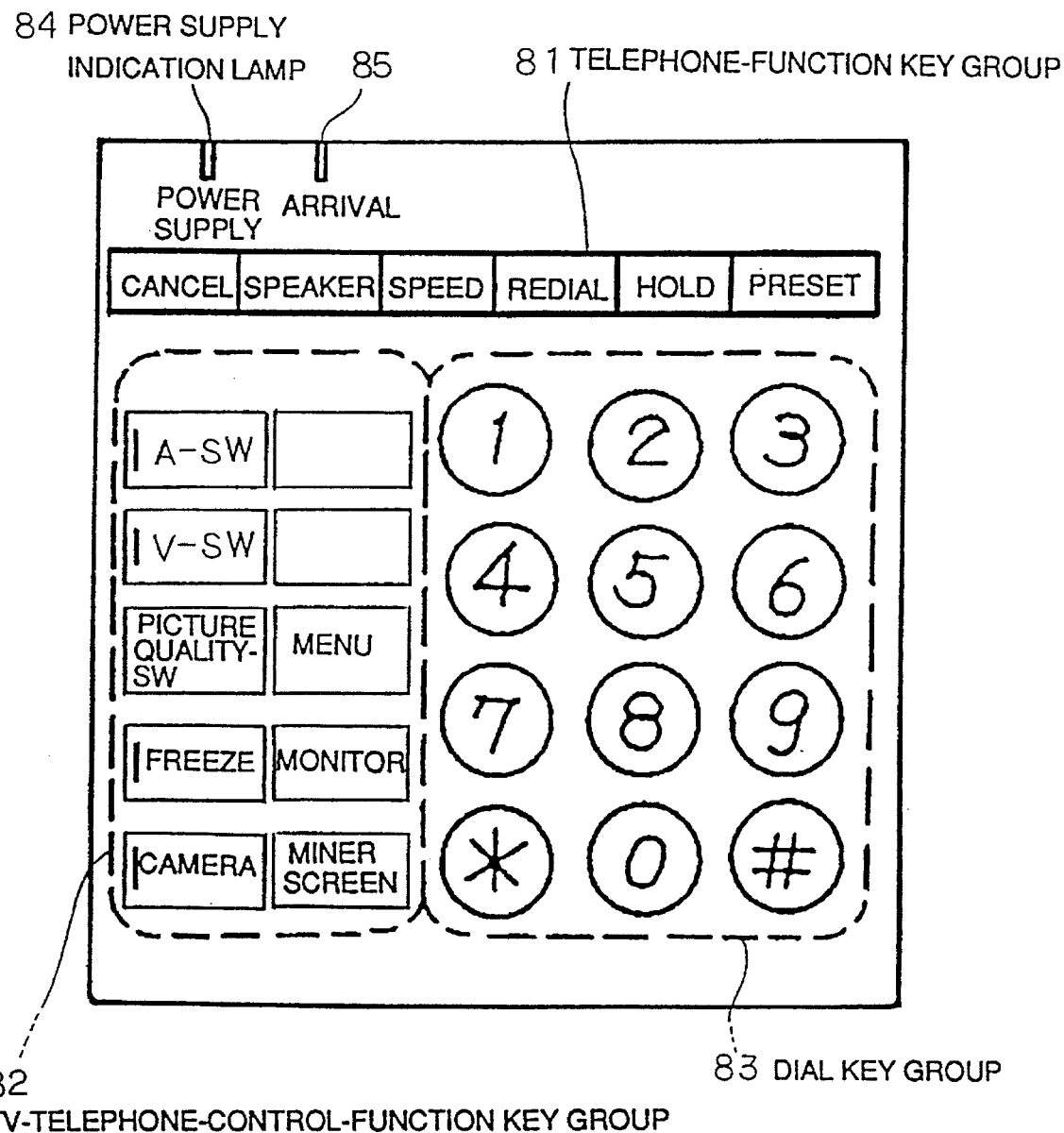
FIG. 5 shows the arrangement of keys of a key panel unit on the video telephone.

FIG. 5 shows the arrangement of keys on the key panel unit 23. As shown in FIG. 5, a telephone-function key group 81, a video-telephone-control-function key group 82 and a dial key group 83 are arranged so as to occupy the respective three sections.

In the video telephone control function keys 81, LEDs are provided on the respective distal key heads of five function keys for indicating whether the voice-switching function (A-SW), the image-switching function (V-SW), the picture-quality-switching (high-picture-quality) function, the hands-free function and the camera function are set respectively. Therefore the user can easily ascertain the status of each function.

A power supply indication lamp 84 is turned on if the power supply switch 71 is switched on, and is turned off if the power supply switch 71 is switched off or if the power supply from an external source is cut off. An indication lamp 85 starts flashing simultaneously with the output of a call sound. The speaker key is used in operating the hands-free function of the telephone-function key group 81.

The operation of the video telephone according to this embodiment will now be described.

As shown in FIG. 1, the ISDN-user-network interface control circuit 24b is equipped with output/input signal terminals for the input/output terminals, which correspond to 2B channels of the ISDN-user-network interface, of the signal-multiplex-separation control circuit 24a, and the ISDN-user-network interface input/output terminal 27. The ISDN-user-network interface control circuit 24b inputs a 2B-channel digital signal containing voice, image and data signals that are multiplexed by the signal-multiplex-separation control circuit 24a, multiplexes this inputted signal with a D-channel (16 kbps) signal, which is a communication line control signal, generates a signal equivalent to 2B plus D channels of the ISDN base interface and outputs this signal to the network. The ISDN-user-network interface control circuit 24b also inputs a signal equivalent to 2B plus D channels from the network, and separates a signal equivalent to 2B channel and outputs the separated signal to the signal-multiplex-separation control circuit 24a. Calling the destination terminal in order to be connected via the network, and controlling communication to connect with and disconnect from the destination terminal, are performed by the ISDN-user-network interface control circuit 24b.

The signal-multiplex-separation control circuit 24a has digital signal input/output functions for voice, image and data systems and multiplexes the digital signals of these three systems, i.e., the image inputted from the image encoding circuit 22g, the voice inputted from the voice communication control circuit 24d, and the data inputted from the microprocessor 24c, the camera control interface circuit 24n or the analog-to-digital and digital to analog converter circuit 24l, and sends them to the ISDN-user-network interface control circuit 24b as the digital signal equivalent to 2B (2×64 kbps) channels. The ISDN-user-network interface control circuit 24b separates the received 2B-channel digital signal into digital signals of the three systems and outputs the image to the image decoding circuit 22f, the voice to the voice communication control circuit 24d and the data to the microprocessor 24c, the camera control interface circuit 24n or the analog-to-digital and digital to analog converter circuit 24l.

In this embodiment, the total signal transmission speeds of the individual systems can be set optionally to a value equivalent to 2B channels, i.e. below 128 kbps; that is, bidirectional multiplex communication control by an arbitrary combination including the voice signal transmission speed of 56 kbps, the image signal transmission speed of 64 kbps and the data signal transmission speed of 8 kbps can be performed. The communication control is performed by the transmission method according to CCITT recommendations H. 221 and H. 242. The microprocessor 24c receives the setting of the signal transmission speeds of the individual systems by a special key input or a combination of key inputs from various kinds of keys of FIG. 5 and controls the signal-multiplex-separation control circuit 24a. To select the facsimile input/output connected to the facsimile input terminal as the data, the setting of the signal transmission speed is received by depressing the FAX key. Alternatively the setting of the signal transmission speed of each system may be received by indicating a predetermined menu on the display and depressing a menu key to make a key input corresponding to the menu.

Upon receipt of control by the microprocessor 24c, the signal-multiplex-separation control circuit 24a controls the function of the image CODEC 22, the lighting function of the LED indication control circuit 23a, the switching function of the video switching circuit 22b and the switching function of the analog switch circuit 24i.

The microprocessor 24c, which has a program connected in a memory, performs the function control of the image CODEC 22 via the signal-multiplex-separation control circuit 24a, the input/output control of the key panel unit 23 and the hardware control such as setting and maintaining the three-system multiplex-separation control of voice, image and data as well as the man-machine interface control such as message output to the display screen.

The timer circuit 24f is a circuit for outputting data about the current data and time, notifying the microprocessor 24c of parameters indicating the time and indicating the current time and communication time period.

The operation of various parts of the image system will now be described.

The color image signal obtained by the camera 21a is outputted to the video switching circuit 22b. As controlled by the microprocessor 24c, the video switching circuit 22b selects an external image input signal or an image signal of the character superimposing circuit 22a and outputs the selected signal to the image input circuit 22e. The image input circuit 22e distributes the output signal of the video switching circuit 22b to an display processing circuit 22d and the image encoding circuit 22g. The image signal inputted to the image encoding circuit 22g is encoded into a digital image signal compressed to the data transmission speed suitable for the transmission band of the transmission lines according to CCITT recommendation H. 261 and outputs the digital image signal to the signal-multiplex-separation control circuit 24a.

Thus the camera image signal or the external image input signal can be selected and can be sent to the ISDN-user-network interface as the digital image signal.

The digital image signal outputted from the image-signal-system output terminal of the signal-multiplex-separation control circuit 24a is decoded into an analog image signal according to CCITT recommendation H. 261 by the image decoding circuit 22f, and the analog image signal is then outputted to the image output circuit 22c.

Also the display processing circuit 22d converts the image signal (transmitted image signal) outputted from the image input circuit 22e into a mirror image or a point-symmetrical image which is inverted by 180 degrees and outputs the converted image signal to the image output circuit 22c. Under the control of the microprocessor 24c, the display processing circuit 22d selects a miner screen display mode or a normal whole screen display mode.

The image output circuit 22c inputs the image signal, which is outputted from the image decoding circuit 22f, and outputs the image signal to the character superimposing circuit 22a under the control of the microprocessor 24c. The image output circuit 22c also selects a miner screen display or a normal whole screen display.

The image to be outputted on the miner screen section is an output signal of the display processing circuit 22d.

The character superimposing circuit 22a inputs the image signal, which is outputted from the image output circuit 22c, and outputs the image signal to display it on the screen of the display 21b. The character superimposing circuit 22a also superimposes, for example, a registered graphic or a character over the output image signal of the image output circuit 22c to display the resulting signal on the display screen.

It is thereby possible to display the motion picture on the display screen by decoding the received digital image signals to reproduce it as analog image signals. Thus it is possible to monitor or display the graphics or characters on the partial screen.

The operation of various parts of the sound system will now be described.

The voice communication control circuit 24d inputs the voice signal from the signal-multiplex-separation control circuit 24a, decodes the analog voice signal, outputs the decoded voice signal to the analog switch circuit 24i, then encodes the analog voice signal, which is inputted from the analog switch circuit 24i, into the digital voice signal and outputs the digital voice signal to the signal-multiplex-separation control circuit 24a. When it sets a hold status during communication, the hold-function control circuit 24e outputs a hold sound to the source-side handset or the destination-side handset. The sounder 24h generates a call sound.

In response to depression of the voice switch-over key on the key panel, the analog switch circuit 24i is controlled by the microprocessor 24c. According to the control of the microprocessor 24c, the analog switch circuit 24i selects the voice signal or the external voice input signal to be sent as the signal source to be outputted to the voice communication control circuit 24d.

In response to the depression of the speaker key on the key panel, the hands-free control circuit 24j is controlled the microprocessor 24c. According to the control of the microprocessor 24c, the hands-free control circuit 24j selects the voice input/output path according to the built-in microphone 24k and the speaker 24g instead of the handset 26. If the voice input/output path according to the built-in microphone 24k and the speaker 24g is selected, the hands-free control circuit 24j compares the input signal of the built-in microphone 24k in level with the output signal of the speaker 24g and allows the higher-level signal to pass and cuts off the lower-level signal. It is therefore possible to prevent oscillation, i.e., howling due to the positive feedback loop so that an excellent hands-free communication using the built-in microphone 24k and the speaker 24g can be realized.

The data system will now be described.

The analog-to-digital converter circuit 24l converts the analog signal, which is converted in level by the analog level converter circuit 24m, and also takes the data signal to convert it into a specific-level analog signal. The analog level converter circuit 24m matches the input/output signal level of the analog-to-digital converter circuit 24l with the input/output level of the facsimile connected to the facsimile terminal 28c.

The camera control interface circuit 24n outputs four kinds of digital control signals, i.e. panning, tilting, focusing and zooming signals for controlling the external camera, via the camera-control-signal input/output terminal 28a.

Now the input/output digital signal of the analog-to-digital converter circuit 24l or the input/output digital signal of the camera control interface circuit 24n is selected by the switch that is controlled by the microprocessor 24c, and is then transmitted to the destination telephone from the ISDN-user-network interface terminal 27 after having passed through the signal-multiplex-separation control circuit 24a as the data signal.

During facsimile transmission, in response to the depressing of the FAX key of FIG. 5, the microprocessor 24c controls the switch so that the data signal, which is to be inputted/outputted to the signal-multiplex-separation, is connected with the analog-to-digital converter circuit 24l. The microprocessor 24c also controls the data transmission rate to set 64 kbps for data and the remaining 64 kbps for voice and image so that facsimile transmission is possible.

By the foregoing operation, the transmission channel of 64 kbps for facsimile is set bidirectionally so that transmission between analog facsimiles is possible.

For facsimile transmission, it should be set by the FAX key both at the destination-side facsimile and at the source-side facsimile, or the signal-multiplex-separation control circuit 24a sends the bit-rate-allocated code to the destination-side telephone, and upon receipt of this code, the destination-side telephone is automatically switched over to the facsimile transmission mode.

Following is the case in which the camera controller and the camera control controller are connected to the camera-control-signal input/output terminal 28a of the video telephone of this embodiment and in which the motion of the external camera connected to the image input terminal 29e of the destination-side telephone is to be remotely controlled.

Figure 6:
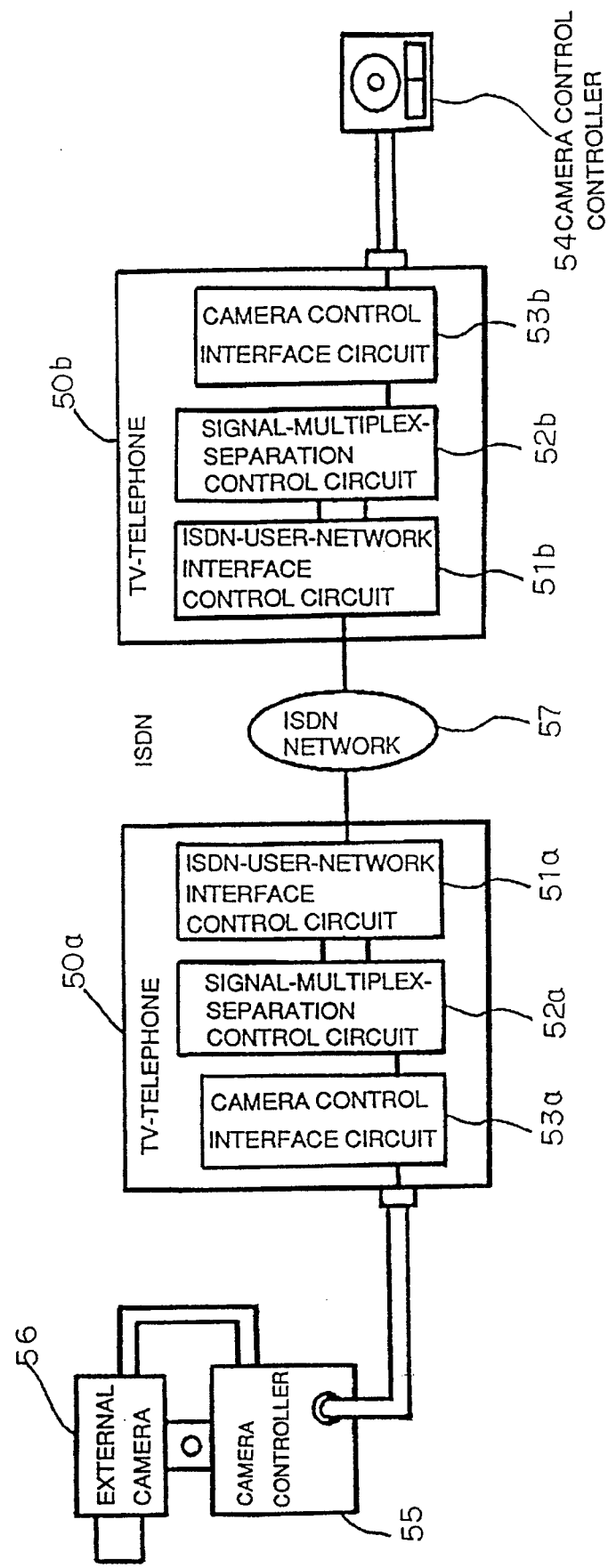
FIG. 6 shows a system in which an external camera is connected to a video telephone.

FIG. 6 shows the system structure in this case.

In FIG. 6, reference numerals 50a and 50b designate two video telephones of FIG. 2; 51a and 51b, ISDN-user-network interface control circuits (corresponding to the circuit 24b of FIG. 1); 52a and 52b, signal-multiplex-separation control circuits (corresponding to the circuits 24a of FIG. 1); 53a and 53b, camera control interface circuits (corresponding to the circuits 24n of FIG. 1); 54, a camera control controller; 55, a camera controller; 56, an external camera; and 57, an ISDN network.

The connection between the video telephone 50a and the camera controller 55 and the connection between the unitary video telephone 50b and the camera control controller 54 are made by respective dedicated cables (four signals).

The camera control digital signals generated by the camera control controller 54 are inputted to the camera control interface circuit 53b as parallel signals. The camera control interface circuit 53b converts the inputted data into serial data which is then inputted to the data port of the signal-multiplex-separation control circuit 52b as data signals. Then the data signals are multiplexed together with voice and image signals, and the multiplexed signals are outputted to the ISDN network 57 via the ISDN-user-network interface control circuit 51b. The multiplexed signal is received by the video telephone 50a, which is the destination side of the video telephone 50b, and is separated into voice, image and data signals in the signal-multiplex-separation control circuit 52a via the ISDN-user-network interface control circuit 51a, and out of the voice, image and data signals, the data signal is reproduced to four parallel signals via the camera control interface circuit 53a, and these parallel signals are outputted to the camera controller 55.

According to the control signals generated in the camera control controller 54, the camera controller 55 controls vertical movement (tilting), horizontal movement (panning), focusing and zooming of the external camera 56.

It is therefore possible to remotely control the position of the external camera connected with the destination-side telephone from the source-side telephone. The camera position of the destination-side telephone can be controlled with ease by ensuring the display of the source-side telephone.

Following is the case in which an external video tape recorder is connected to the video telephone of this embodiment to realize the caretaker voice/image recording.

Figure 7:
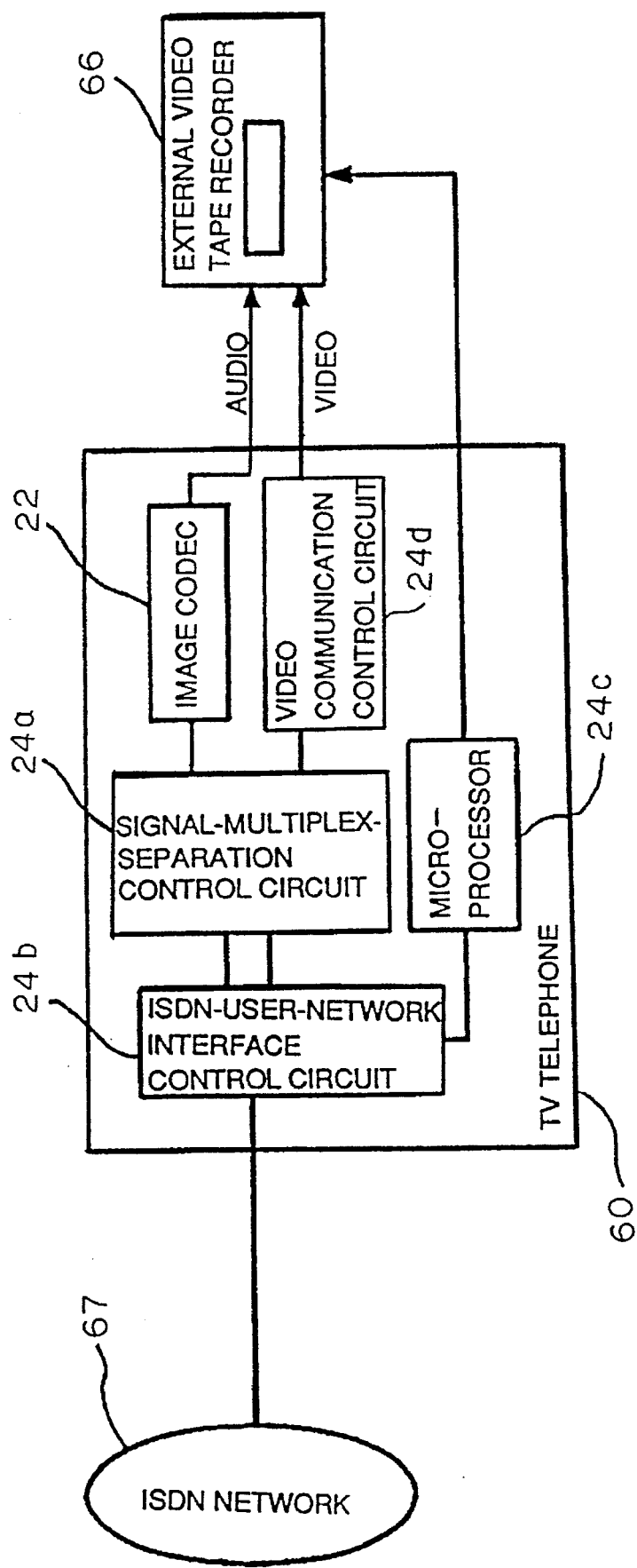
FIG. 7 shows a video telephone to which an external video tape recorder is connected.

In FIG. 7, reference numeral 60 designates a video telephone which comprises the microprocessor 24c, the signal-multiplex-separation control circuit 24a, the image CODEC 22, the voice communication control circuit 24d and the ISDN-user-network interface control circuit 24b. Further, 66 designates an external video tape recorder, and 67, an ISDN network.

Figure 8:
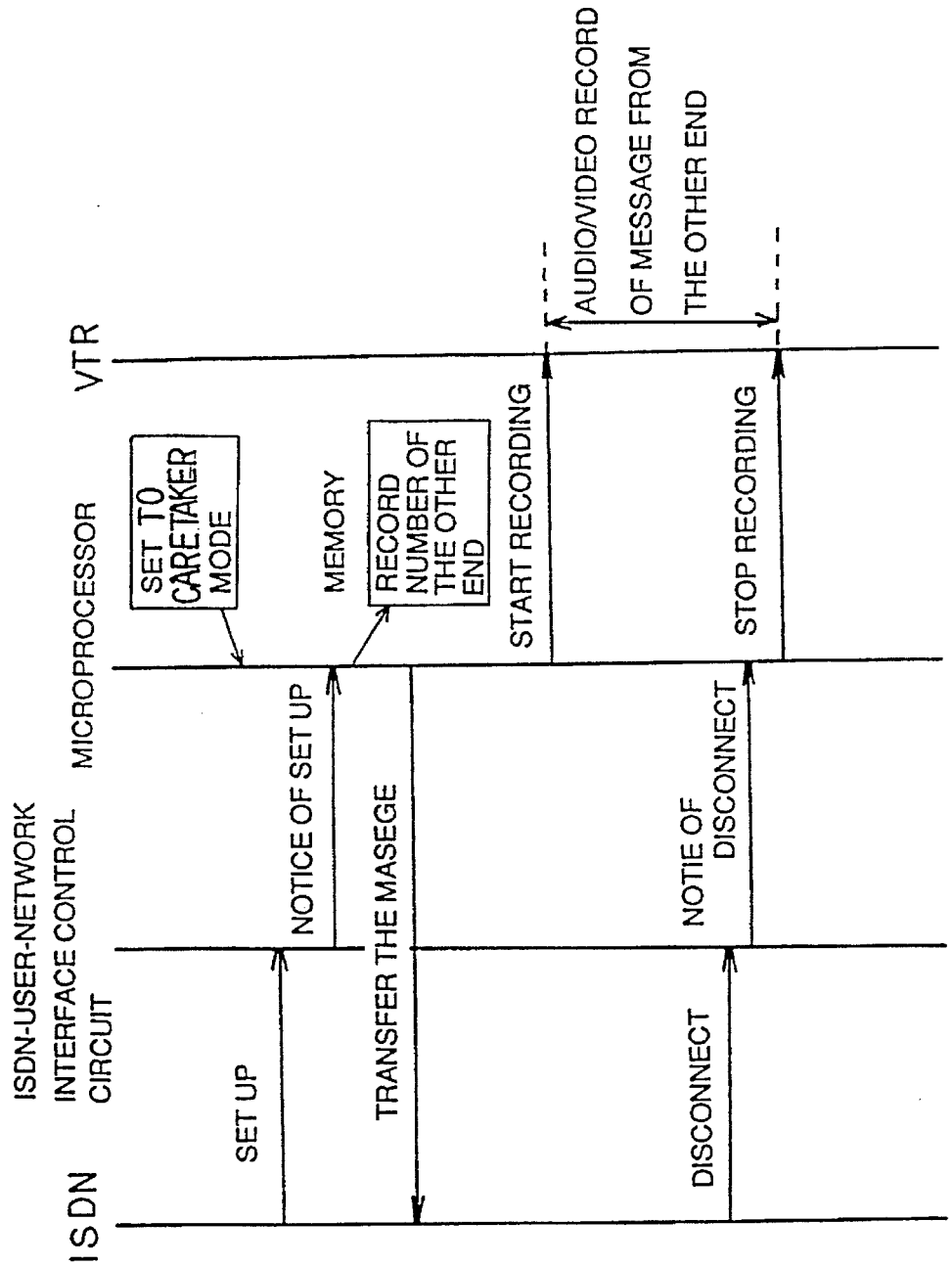
FIG. 8 is a diagram showing the sequence of caretaker image recording.

FIG. 8 shows the procedures to realize the caretaker voice/image recording operation with this structure.

As shown in FIG. 7, first the source-side video telephone is set to the caretaker mode by the key panel. The setting of the caretaker mode displays a predetermined menu on the display 21b according to the menu key shown in FIG. 5, so that the input as set will be received. During the caretaker mode, the microprocessor 24c controls various parts so as to perform automatic receiving communication.

If any communication is received from the destination-side telephone, the ISDN-user-network control circuit 24b automatically performs the communication receiving operation, notifies the microprocessor 24c of this receipt and detects the telephone number of the destination-side telephone from the received information so as to be able to store the number in the built-in memory.

The telephone at this end of the line transmits the absence message to the telephone at the other end to notify that the person at this end is absent. The absence message may be predetermined image information stored in the video tape recorder 66 or may be predetermined image information that is stored in other data storage means.

Then the microprocessor 24c instructs the external video tape recorder 66 to start recording. The video tape recorder 66 is previously connected to the external voice output terminal 29b and the image output terminal 29e of the telephone at this end via respective cables. Between the microprocessor 24c and the video tape recorder 66, a remote-control signal line of the video tape recorder 66 is connected.

After having received any message from the telephone at the other end, the unitary video telephone 60 that has received from the network a notice of disconnect due to the disconnect of a call from the telephone at the other end controls the video tape recorder 66 to stop recording and then returns to the standby state.

Thus it is possible to record the message in voice and image while there is nobody at the receiving-side telephone.

If the power supply from an external source is cut off, the video telephone of this embodiment may operate the voice communicating function using a local power supply taken from the ISDN network, as described below.

Figure 9:
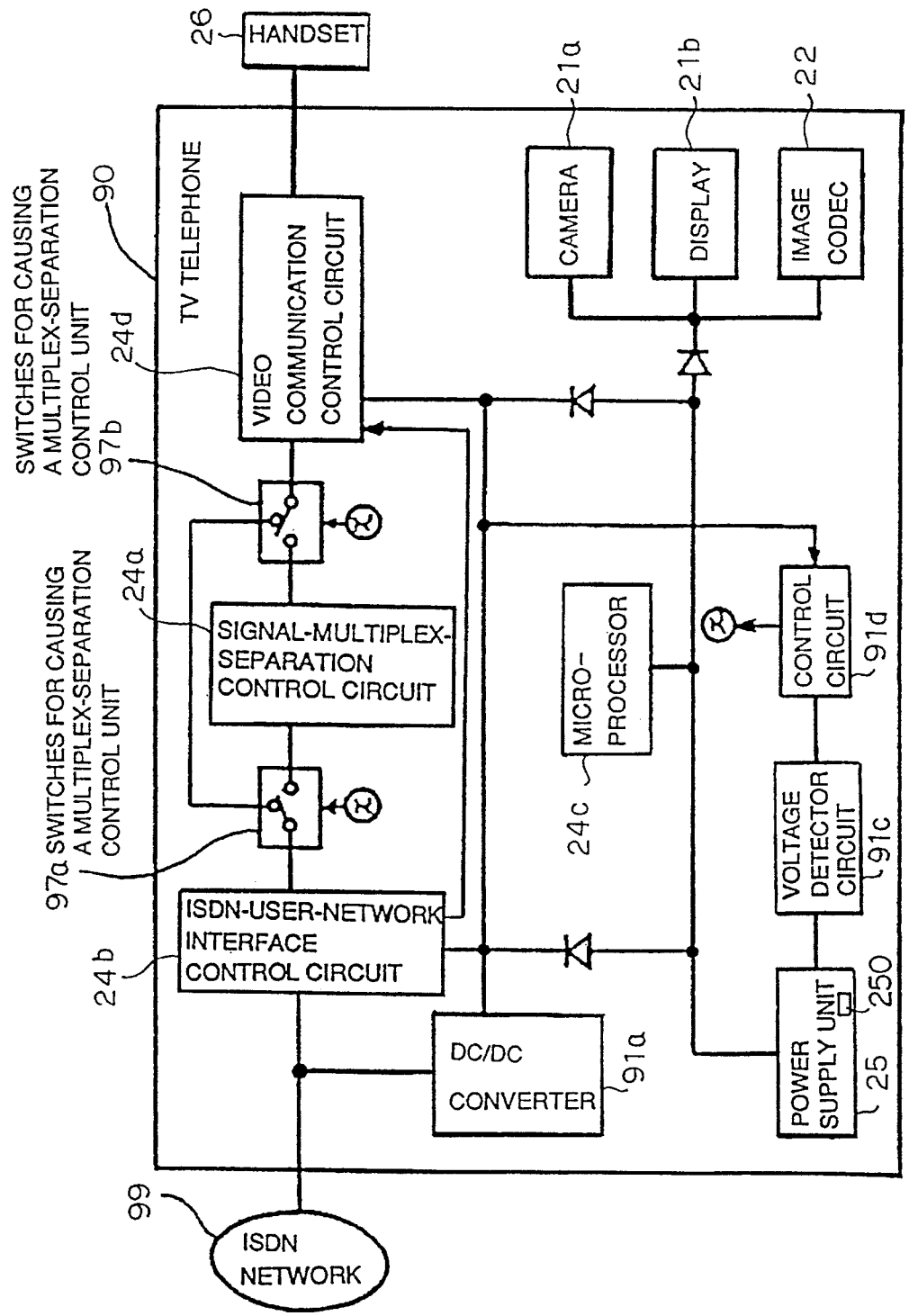
FIG. 9 is a block diagram showing a video telephone with which voice communication is possible even when there is an interruption of the power supply.

FIG. 9 shows this kind of video telephone for realizing the foregoing operation.

As shown in FIG. 9, the video telephone 90 comprises an ISND-user-network interface control circuit 24b, a signal-multiplex-separation control circuit 24a, a microprocessor 24c, a voice communication control circuit 24d, a handset 26, an image CODEC 22, the camera 21a and a display 21b.

In FIG. 9, reference numeral 91a designates a DC-to-DC converter for converting a d.c. voltage from the local source into a constant voltage; 25b, a power source; 91c, a voltage detector circuit for detecting whether or not a commercial power supply is present; 91d, a control circuit for realizing the voice communication function while the commercial power supply is cut off; 97a and 97b, switches for causing a multiplex-separation control unit 93 to be bypassed so that the amount of electric power to be consumed in the circuit at the time of local power supply can be reduced; and 99, an ISDN network.

With this arrangement, when the input of the external commercial power to the power source unit is stopped, the voltage detector circuit 91c detects the absence of the external power supply and gives such notice to the control circuit 91d. The control circuit 91d causes the signal-multiplex-separation control circuit 24a to be bypassed in order to save on the amount of electric power to be consumed and controls the switches 97a, 97b in such a manner that the voice signal is connected to the voice communication control circuit 24d directly by the ISDN-user-network interface control circuit 24b. The DC-to-DC converter 91a reduces a d.c. voltage from a local power source into a constant d.c. voltage and supplies the voltage only to the circuit that realizes the voice communication function.

If the voltage detector circuit 91c detects the absence of any external voltage, the control circuit 91d sets the ISDN-user-network interface control circuit 24d in such a manner that a telephone controller 95 is controlled by the ISDN-user-network interface control circuit 24b.

It is thus possible to realize the voice communication function even when the power supply is cut off.

In the video telephone of this embodiment, the power supply unit 25 may be equipped with a charger and a charge control circuit 250 for normally charging the charger with the local supply power until the charged electric power exceeds a value capable of driving the entire system for a constant time and for supplying to various parts the electric power charged in the charger when the power supply is cut off, so that not only the voice communication function but also the entire system can be operated in the same manner as when the power supply is not cut off.

Further, the video telephone may be equipped with a memory for storing telephone numbers, the names of the owners of the telephones and other information as well as image information about the owner such as an identification picture, so that when receiving a message, if the calling telephone number can be found in the memory, the name and information of the owner as well as image information will be indicated on the display.

If there are provided the automatic transmission mode for transmitting the image to the telephone at other end upon connection therewith and the manual transmission mode for transmitting the image to the telephone at the other end after receiving a predetermined key input after being connected with the other end, the video telephone may be equipped with a memory for storing a plurality of telephone numbers, so that if the telephone number of the other end is not stored in the memory even in the automatic transmission mode, the control may be forcibly switched over to the manual transmission mode.

As mentioned above, according to the video telephone of this invention, since it is equipped with a lamp, it is possible to shoot a picture, a piece of writing or an other document well. The video telephone can also be connected with an analog facsimile machine, and enables communication without holding the handset, thanks to the hands-free function.

What is claimed is:

1. A video telephone for exchanging image data, voice data and user data through a digital communication channel in real time, comprising:

(a) a communication controller for controlling communication of image data, voice data and user data, which are multiplexed, through the digital communication channel;

(b) a multiplexor-separator for separating multiplexed image data and voice data received by said communication controller, and for multiplexing image data and voice data into multiplexed data which are to be transmitted, (c) an image CODEC for decoding image data, which are separated by said multiplexor-separator, into an image signal and for coding an input image signal into image data and transmitting image data to said multiplexor-separator;

(d) a camera for outputting an image signal, which is taken by said camera, to said image CODEC as an image signal to be coded;

(e) a display for displaying an image represented by an image signal which is decoded by said image CODEC;

(f) a voice communication controller for decoding voice data, which are separated by said multiplexor-separator into voice signal and for coding an input voice signal into voice data and transmitting voice data to said multiplexor-separator;

(g) a speaker for outputting a voice represented by a voice signal which is decoded by said voice communication controller;

(h) a microphone for transmitting the voice signal, which is produced by said microphone, to said voice communication controller as the voice signal to be coded;

(i) a power supply unit for receiving a supply of power from an external source and distributing the power to each electrical part of the video telephone;

(j) a key input unit having a plurality of keys;

(k) an image input terminal;

(l) an image output terminal for outputting the image signal decoded by said image CODEC;

(m) a video switch for outputting the image signal from said camera or the input image signal from said image input terminal to said image CODEC as the image signal to be coded;

(n) a voice input terminal;

(o) a voice output terminal;

(p) an audio switch for outputting an input signal from said voice input terminal or the voice signal taken by the microphone to said voice communication controller as the voice signal to be coded, and for outputting the voice signal, which is decoded by said voice communication controller, to said speaker or said voice output terminal;

(q) a data terminal; and (r) a control unit, responsive to the key input from said key input unit, for controlling said video switch and said audio switch and controlling inputting and outputting of user data between said multiplexor-separator and said data terminal.

2. A video telephone according to claim 1, wherein said control unit displays a guidance information for guiding operations of the key input from said key input unit on said display.

3. A video telephone for exchanging image data, voice data and user data through a digital communication channel in real time, comprising:

(a) a communication controller for controlling communication of image data, and voice data and user data, which are multiplexed, through the digital communication channel;

(b) a multiplexor-separator for separating multiplexed image data voice data and user data received by said communication controller, and for multiplexing image data voice data and user data into multiplexed data which are to be transmitted;

(c) an image CODEC for decoding image data, which are separated by said multiplexor-separator, into an image signal and for coding an input image signal into image data and transmitting image data to said multiplexor-separator;

(d) a camera for outputting an image signal, which is taken by said camera, to said image CODEC as an image signal to be coded;

(e) a display for displaying an image represented by an image signal which is decoded by said image CODEC;

(f) a voice communication controller for decoding voice data, which are separated by said multiplexor-separator, into voice signal and for coding an input voice signal into voice data and transmitting voice data to said multiplexor-separator;

(g) a speaker for outputting a voice represented by a voice signal which is decoded by said voice communication controller;

(h) a microphone for transmitting the voice signal, which is produced by said microphone, to said voice communication controller as the voice signal to be coded;

(i) a power supply unit for receiving a supply of power from an external source and distributing the power to each electrical part of the video telephone;

(j) a key input unit having a plurality of keys;

(k) an image input terminal;

(l) an image output terminal for outputting the image signal decoded by said image CODEC;

(m) a video switch for outputting the image signal from said camera or the input image signal from said image input terminal to said image CODEC as the image signal to be coded;

(n) a voice input terminal;

(o) a voice output terminal;

(p) an audio switch for outputting an input signal from said voice input terminal or the voice signal taken by the microphone to said voice communication controller as the voice signal to be coded, and for outputting the voice signal, which is decoded by said voice communication controller, to said speaker or said voice output terminal;

(q) an external camera control terminal;

(r) a data terminal; and (s) a control unit, responsive to the key input from said key input unit, for controlling said video switch and said audio switch, controlling of outputting of the user data to said external camera control terminal and controlling inputting and outputting user data between said multiplexor-separator and said data terminal.

4. A video telephone for exchanging image data voice data and user data through a digital communication channel in real time, comprising:

(a) a communication controller for controlling communication of image data and voice data, which are multiplexed, through the digital communication channel;

(b) a multiplexor-separator for separating multiplexed image data voice data and user data received by said communication controller, and for multiplexing image data voice data and user data into multiplexed data which are to be transmitted;

(c) an image CODEC for decoding image data, which are separated by said multiplexor-separator, into an image signal and for coding an input image signal into image data and transmitting image data to said multiplexor-separator;

(d) a camera for outputting an image signal, which is taken by said camera, to said image CODEC as an image signal to be coded;

(e) a display for displaying an image represented by an image signal which is decoded by said image CODEC;

(f) a voice communication controller for decoding voice data, which are separated by said multiplexor-separator, into voice signal and for coding an input voice signal into voice data and transmitting voice data to said multiplexor-separator;

(g) a speaker for outputting a voice represented by a voice signal which is decoded by said voice communication controller;

(h) a microphone for transmitting the voice signal, which is produced by said microphone, to said voice communication controller as the voice signal to be coded;

(i) a power supply unit for receiving a supply of power from an external source and distributing the power to each electrical part of the video telephone;

(j) a key input unit having a plurality of keys;

(k) an image input terminal;

(l) an image output terminal for outputting the image signal decoded by said image CODEC;

(m) a video switch for outputting the image signal from sa camera or the input image signal from said image input terminal to said image CODEC as the image signal to be coded;

(n) a voice input terminal;

(o) a voice output terminal;

(p) an audio switch for outputting an input signal from said voice input terminal or the voice signal taken by the microphone, to said voice communication controller as the voice signal to he coded, and for outputting the voice signal, which is decoded by said voice communication controller, to said speaker or said voice output terminal;

(q) a facsimile terminal; and (r) a control unit, responsive to the key input from said key input unit, for controlling said video switch and said audio switch and controlling of inputting and outputting of the user data between said multiplexor-separator and said facsimile terminal.

5. A video telephone for exchanging image data, voice data and user data through a digital communication channel in real time, comprising:

(a) a communication controller for controlling communication of image data, voice data and user data, which are multiplexed, through the digital communication channel;

(b) a multiplexor-separator for separating multiplexed image data and voice data received by said communication controller, and for multiplexing image data and voice data into multiplexed data which are to be transmitted;

(c) an image CODEC for decoding image data, which are separated by said multiplexor-separator, into an image signal and for coding an input image signal into image data and transmitting image data to said multiplexor-separator;

(d) a camera for outputting an image signal, which is taken by said camera, to said image CODEC as an image signal to be coded;

(e) a display for displaying an image represented by an image signal which is decoded by said image CODEC;

(f) a voice communication controller for decoding voice data, which are separated by said multiplexor-separator, into voice signal and for coding an input voice signal into voice data and transmitting voice data to said multiplexor-separator;

(g) a speaker for outputting a voice represented by a voice signal which is decoded by said voice communication controller;

(h) a microphone for transmitting the voice signal, which is produced by said microphone, to said voice communication controller as the voice signal to be coded;

(i) a power supply unit for receiving a supply of power from an external source and distributing the power to each electrical part of the video telephone;

(j) a key input unit having a plurality of keys;

(k) an image input terminal;

(l) an image output terminal for outputting the image signal decoded by said image CODEC;

(m) a video switch for outputting the image signal from said camera or the input image signal from said image input terminal to said image CODEC as the image signal to be coded;

(n) a voice input terminal;

(o) a voice output terminal;

(p) an audio switch for outputting an input signal from sand voice input terminal or the voice signal taken by the microphone to said voice communication controller as the voice signal to be coded, and for outputting the voice signal, which is decoded by said voice communication controller, to said speaker or said voice output terminal;

(q) a data terminal;

(r) a control unit, responsive to the key input from said key input unit, for controlling said video switch and said audio switch and controlling inputting and outputting of user data between said multiplexor-separator and said data terminal;

(s) a base section incorporating said communication controller, said multiplexor-separator, said image CODEC, said voice communication controller, said speaker, said microphone, said power supply unit, said key input unit, said image input terminal, said image output terminal, said video switch, said voice input terminal, said voice output terminal, said audio switch and said control unit; and (t) an upper section, which is arranged above said base section and connected to said base section, incorporating said camera and said display.

6. A video telephone according to claim 5, wherein said power supply unit comprises:

first power distributing means for receiving a supply of power from an external source and distributing the power to each electrical part of the video telephone;

means for detecting interruption of supply of power from said external power source; and second power distributing means for receiving a supply of power from a secondary power source and distributing the power to at least of said communication controller, said multiplexor-separator and said voice communication controller, in a period in which said interruption of supply of power from said external power source is detected, said second power distributing means never distributing the power to at least of said image CODEC, said display and said camera in said period.

7. A video telephone for exchanging image data voice data and user data through a digital communication channel in real time, comprising:

(a) a communication controller for controlling communication of image data and voice data, which are multiplexed, through the digital communication channel;

(b) a multiplexor-separator for separating multiplexed image data voice data and user data received by said communication controller, and for multiplexing image data voice data and user data into multiplexed data which are to be transmitted;

(c) an image CODEC for decoding image data, which are separated by said multiplexor-separator, into an image signal and for coding an input image signal into image data and transmitting image data to said multiplexor-separator;

(d) a camera for outputting an image signal, which is taken by said camera, to said image CODEC as an image signal to be coded;

(e) a display for displaying an image represented by an Image signal which is decoded by said image CODEC;

(f) a voice communication controller for decoding voice data, which are separated by said multiplexor-separator, into voice signal and for coding an input voice signal into voice data and transmitting voice data to said multiplexor-separator;

(g) a speaker for outputting a voice represented by a voice signal which is decoded by said voice communication controller;

(h) a microphone for transmitting the voice signal, which is produced by said microphone, to said voice communication controller as the voice signal to be coded;

(i) a power supply unit for receiving a supply of power from an external source and distributing the power to each electrical part of the video telephone;

(i) a key input unit having a plurality of keys;

(k) an image input terminal;

(l) an image output terminal for outputting the image signal decoded by said image CODEC;

(m) a video switch for outputting the image signal from said camera or the input image signal from said image input terminal to said image CODEC as the image signal to be coded;

(n) a voice input terminal;

(o) a voice output terminal;

(p) an audio switch for outputting an input signal from said voice input terminal or the voice signal taken by the microphone, to said voice communication controller as the voice signal to be coded, and for outputting the voice signal, which is decoded by said voice communication controller, to said speaker or said voice output terminal;

(q) a data terminal; and (r) a control unit, responsive to the key input from said key input unit, for controlling said video switch and said audio switch and controlling of inputting and outputting of the user data between said multiplexor-separator and said data terminal.

8. A video telephone for exchanging image data and voice data through a digital communication channel in real time, comprising:

(a) a communication controller for controlling communication of image data, voice data and user data, which are multiplexed, through the digital communication channel;

(b) a multiplexor-separator for separating multiplexed image data, voice data and user data received by said communication control and for multiplexing image data and voice data into multiplexed data which are to be transmitted;

(c) an image CODEC for decoding image data, which are separated by said multiplexor-separator, into an image signal and for coding an input image signal into image data and transmitting image data to said multiplexor-separator;

(d) a camera for outputting an image signal, which is taken by said camera, to said image CODEC as an image signal to be coded;

(e) a display for displaying an image represented by an image signal which is decoded by said image CODEC;

(f) a voice communication controller for decoding voice data, which are separated by said multiplexor-separator, into voice signal and for coding an input voice signal into voice data and transmitting voice data to said multiplexor-separator;

(g) a speaker for outputting a voice represented by a voice signal which is decoded by said voice communication controller;

(h) a microphone for transmitting the voice signal, which is produced by said microphone, to said voice communication controller as the voice signal to be coded;

(i) a power supply unit for receiving a supply of power from an external source and distributing the power to each electrical part of the video telephone;

(j) a key input unit having a plurality of keys;

(k) an image input terminal;

(l) an image output terminal for outputting the image signal decoded by said image CODEC;

(m) a video switch for outputting the image signal from said camera or the input image signal from said image input terminal to said image CODEC as the image signal to be coded;

(n) a voice input terminal;

(o) a voice output terminal;

(p) an audio switch for outputting an input signal from said voice input terminal or the voice signal taken by the microphone to said voice communication controller as the voice signal to be coded, and for outputting the voice signal, which is decoded by said voice communication controller, to said speaker or said voice output terminal;

(q) a data terminal; and (r) a control unit, responsive to the key input from said key input unit, for controlling said video switch and said audio switch and varying data transmission rate respective of image data and voice data on said digital communication channel and controlling inputting and outputting of user data between said multiplexor-separator and said data terminal.

9. A video telephone for exchanging image data, voice data and user data through a digital communication channel or channels in real time, comprising:

(a) a communication controller for controlling communication of image data, voice data and user data, which are multiplexed, through the digital communication channel;

(b) a multiplexor-separator for separating multiplexed image data and voice data received by said communication control and for multiplexing image data and voice data into multiplexed data which are to be transmitted;

(c) an image CODEC for decoding image data, which are separated by said multiplexor-separator, into an image signal and for coding an input image signal into image data and transmitting image data to said multiplexor-separator;

(d) a camera for outputting an image signal, which is taken by said camera, to said image CODEC as an image signal to be coded;

(e) a display for displaying an image represented by an image signal which is decoded by said image CODEC;

(f) a voice communication controller for decoding voice data, which are separated by said multiplexor-separator, into voice signal and for coding an input voice signal into voice data and transmitting voice data to said multiplexor-separator;

(g) a speaker for outputting a voice represented by a voice signal which is decoded by said voice communication controller;

(h) a microphone for transmitting the voice signal, which is produced by said microphone, to said voice communication controller as the voice signal to be coded;

(i) a power supply unit for receiving a supply of power from an external source and distributing the power to each electrical part of the video telephone;

(j) a key input unit having a plurality of keys;

(k) an image input terminal;

(l) an image output terminal for outputting the image signal decoded by said image CODEC;

(m) a video switch for outputting the image signal from said camera or the input image signal from said image input terminal to said image CODEC as the image signal to be coded;

(n) a voice input terminal;

(o) a voice output terminal;

(p) an audio switch for outputting an input signal from said voice input terminal or the voice signal taken by the microphone to said voice communication controller as the voice signal to be coded, and for outputting the voice signal, which is decoded by said voice communication controller, to said speaker or said voice output terminal;

(q) a facsimile terminal; and (r) a control unit, responsive to the key input from said key input unit, for controlling said video switch and said audio switch and controlling inputting and outputting of user data between said multiplexor-separator and said facsimile terminal.

10. A video telephone according to claim 9, wherein said control unit displays a guidance information for guiding operations of the key input from said key input unit on said display.

11. A video telephone for exchanging image data, voice data and user data through a digital communication channel in real time, comprising:

(a) a communication controller for controlling communication of image data, voice data and user data, which are multiplexed, through the digital communication channel;

(b) a multiplexor-separator for separating multiplexed image data and voice data received by said communication controller, and for multiplexing image data and voice data into multiplexed data which are to be transmitted;

(c) an image CODEC for decoding image data, which are separated by said multiplexor-separator, into an image signal and for coding an input image signal into image data and transmitting image data to said multiplexor-separator;

(d) a camera for outputting an image signal, which is taken by said camera, to said image CODEC as an image signal to be coded;

(e) a display for displaying an image represented by an image signal which is decoded by said image CODEC;

(f) a voice communication controller for decoding voice data, which are separated by said multiplexor-separator, into voice signal and for coding an input voice signal into voice data and transmitting voice data to said multiplexor-separator;

(g) a speaker for outputting a voice represented by a voice signal which is decoded by said voice communication controller;

(h) a microphone for transmitting the voice signal, which is produced by said microphone, to said voice communication controller as the voice signal to be coded;

(i) a power supply unit for receiving a supply of power from an external source and distributing the power to each electrical part of the video telephone;

(j) a key input unit having a plurality of keys;

(k) an image input terminal;

(l) an image output terminal for outputting the image signal decoded by said image CODEC;

(m) a video switch for outputting the image signal from said camera or the input image signal from said image input terminal to said image CODEC as the image signal to be coded;

(n) a voice input terminal;

(o) a voice output terminal;

(p) an audio switch for outputting an input signal from sand voice input terminal or the voice signal taken by the microphone to said voice communication controller as the voice signal to be coded, and for outputting the voice signal, which is decoded by said voice communication controller, to said speaker or said voice output terminal;

(q) a facsimile terminal;

(r) a control unit, responsive to the key input from said key input unit, for controlling said video switch and said audio switch and controlling inputting and outputting of user data between said multiplexor-separator and said facsimile terminal;

(s) a base section incorporating said communication controller, said multiplexor-separator, said image CODEC, said voice communication controller, said speaker, said microphone, said power supply unit, said key input unit, said image input terminal, said image output terminal, said video switch, said voice input terminal, said voice output terminal, said audio switch and said control unit; and (t) an upper section, which is arranged above said base section and connected to said base section, incorporating said camera and said display.

12. A video telephone according to claim 11, wherein said power supply unit comprises:

first power distributing means for receiving a supply of power from an external source and distributing the power to each electrical part of the video telephone;

means for detecting interruption of supply of power from said external power source; and second power distributing means for receiving a supply of power from a secondary power source and distributing the power to at least of said communication controller, said multiplexor-separator and said voice communication controller, in a period in which said interruption of supply of power from said external power source is detected, said second power distributing means never distributing the power to at least of said image CODEC, said display and said camera in said period.

13. A video telephone for exchanging image data, voice data and user data through a digital communication channel in real time, comprising:

(a) a communication controller for controlling communication of image data, voice data and user data, which are multiplexed, through the digital communication channel or channels;

(b) a multiplexor-separator for separating multiplexed image data, voice data and user data received by said communication control and for multiplexing image data and voice data into multiplexed data which are to be transmitted;

(c) an image CODEC for decoding image data, which are separated by said multiplexor-separator, into an image signal and for coding an input image signal into image data and transmitting image data to said multiplexor-separator;

(d) a camera for outputting an image signal, which is taken by said camera, to said image CODEC as an image signal to be coded;

(e) a display for displaying an image represented by an image signal which is decoded by said image CODEC;

(f) a voice communication controller for decoding voice data, which are separated by said multiplexor-separator, into voice signal and for coding an input voice signal into voice data and transmitting voice data to said multiplexor-separator;

(g) a speaker for outputting a voice represented by a voice signal which is decoded by said voice communication controller;

(h) a microphone for transmitting the voice signal, which is produced by said microphone, to said voice communication controller as the voice signal to be coded;

(i) a power supply unit for receiving a supply of power from an external source and distributing the power to each electrical part of the video telephone;

(j) a key input unit having a plurality of keys;

(k) an image input terminal;

(l) an image output terminal for outputting the image signal decoded by said image CODEC;

(m) a video switch for outputting the image signal from said camera or the input image signal from said image input terminal to said image CODEC as the image signal to be coded;

(n) a voice input terminal;

(o) a voice output terminal;

(p) an audio switch for outputting an input signal from said voice input terminal or the voice signal taken by the microphone to said voice communication controller as the voice signal to be coded, and for outputting the voice signal, which is decoded by said voice communication controller, to said speaker or said voice output terminal;

(q) a facsimile terminal; and (r) a control unit, responsive to the key input from said key input unit, for controlling said video switch and said audio switch and varying data transmission rate respective of image data and voice data on said digital communication channel and controlling of inputting and outputting of user data between said multiplexor-separator and said facsimile terminal.

* * * * *